United States Patent
Gedge et al.

(10) Patent No.: US 10,194,020 B2
(45) Date of Patent: Jan. 29, 2019

(54) LINE FAULT LOCALISATION

(71) Applicant: BRITISH TELECOMMUNICATIONS PUBLIC LIMITED COMPANY, London (GB)

(72) Inventors: Richard Gedge, London (GB); Ian Neild, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/761,239

(22) PCT Filed: Aug. 23, 2016

(86) PCT No.: PCT/EP2016/069894
§ 371 (c)(1),
(2) Date: Mar. 19, 2018

(87) PCT Pub. No.: WO2017/054990
PCT Pub. Date: Apr. 6, 2017

(65) Prior Publication Data
US 2018/0278742 A1    Sep. 27, 2018

(30) Foreign Application Priority Data
Sep. 30, 2015   (EP) ...................... 15187738

(51) Int. Cl.
*H04M 1/24*    (2006.01)
*H04M 3/08*    (2006.01)
(Continued)

(52) U.S. Cl.
CPC .............. *H04M 3/085* (2013.01); *H04B 3/46* (2013.01); *H04M 3/10* (2013.01); *H04M 3/2209* (2013.01); *H04M 3/304* (2013.01); *H04M 3/306* (2013.01)

(58) Field of Classification Search
CPC ........ H04B 3/46; H04B 43/0882; H04B 3/32; H04L 12/2856; H04L 1/0015;
(Continued)

(56) References Cited

U.S. PATENT DOCUMENTS 6,970,560 B1 * 11/2005 Hench .................. H04L 5/0046
                                                       375/254
7,987,228 B2 * 7/2011 McKeown .......... H04L 12/2801
                                                       379/1.01
(Continued)

FOREIGN PATENT DOCUMENTS

WO    WO 2013/154579    10/2013

OTHER PUBLICATIONS

International Search Report for PCT/EP2016/069894, dated Oct. 26, 2016, 3 pages.
(Continued)

*Primary Examiner* — Binh Kien Tieu
(74) *Attorney, Agent, or Firm* — Nixon & Vanderhye PC

(57) ABSTRACT

The invention relates to a method of managing a digital subscriber line, in particular for identifying the location of weather related faults. The invention continuously measures the signal to noise (SNR) margin on the DSL line as well as measurements from weather related sensors, such as moisture and wind sensors, which each have an associated geographical location. The SNR margin measures are compared to predetermined conditions based on SNR margin characteristics associated with a population of good lines. If the SNR margin measures fail to meet the predetermined conditions, the SNR measures are also compared to the weather sensor measurements over a day or number of days. If there is a correlation between the SNR margin measures and at least one of the sensors, then location of the fault is
(Continued)

identified as the location of the sensor having the strongest correlation with the SNR measures.

6 Claims, 6 Drawing Sheets

(51) Int. Cl.
*H04M 3/22* (2006.01)
*H04M 3/30* (2006.01)
*H04B 3/46* (2015.01)
*H04M 3/10* (2006.01)

(58) Field of Classification Search
CPC ............... H04L 1/0021; H04L 41/0816; H04L 41/0869; H04L 12/2869; H04L 41/5035; H04L 43/0847; H04M 3/306
USPC ............ 379/1.01, 1.03, 1.04, 9, 9.03, 14.01, 379/10.01, 10.03, 12, 15.01, 15.03, 15.05, 379/22, 22.02, 22.03, 22.04, 22.08, 23, 379/24, 32.01, 32.02, 32.04
See application file for complete search history.

(56) References Cited

U.S. PATENT DOCUMENTS

| | | | |
|---|---|---|---|
| 8,792,620 B2* | 7/2014 | Flowers | H04M 3/306 379/1.04 |
| 9,003,460 B2* | 4/2015 | Basile | H04N 17/004 370/241 |
| 9,998,590 B2* | 6/2018 | Gedge | H04M 3/10 |
| 2002/0176544 A1* | 11/2002 | Liu | H04L 27/2608 379/22.08 |
| 2003/0021391 A1* | 1/2003 | Rubin | H04M 3/30 379/22.04 |
| 2004/0114729 A1 | 6/2004 | Rude | |
| 2005/0190826 A1* | 9/2005 | Van Bruyssel | H04L 1/0003 372/222 |
| 2009/0168972 A1* | 7/2009 | Cioffi | H04M 3/304 379/1.04 |
| 2009/0175199 A1* | 7/2009 | Trojer | H04L 12/2856 370/254 |
| 2010/0014645 A1* | 1/2010 | Feng | H04B 3/46 379/27.01 |
| 2012/0321052 A1* | 12/2012 | Morrill | H04L 29/06027 379/32.01 |
| 2014/0098705 A1* | 4/2014 | Chow | H04L 12/2898 370/254 |
| 2014/0269876 A1 | 9/2014 | Cunningham et al. | |
| 2015/0063141 A1* | 3/2015 | Rohlfing | H04L 43/0882 370/252 |
| 2015/0189075 A1* | 7/2015 | Hwang | H04M 3/30 379/1.03 |
| 2015/0288811 A1* | 10/2015 | Kerpez | H04B 3/32 379/28 |
| 2015/0350417 A1* | 12/2015 | Rhee | H04L 12/2869 379/1.03 |
| 2016/0077073 A1* | 3/2016 | Hansmann | G01N 21/783 436/39 |
| 2017/0214791 A1* | 7/2017 | Gedge | H04M 3/10 |
| 2018/0234131 A1* | 8/2018 | Gedge | H04M 3/08 |

OTHER PUBLICATIONS

"Leaf wetness" from Wikipedia, Retrieved on Sep. 30, 2015, from http://en.wikipedia.org/wiki/Leaf wetness, 1 page.

Nilsson, "Management of a DSL copper network using built-up qualification tools", Master's Degree Project, Stockholm 2005 (86 pages).

* cited by examiner

LINE FAULT LOCALISATION

This application is the U.S. national phase of International Application No. PCT/EP2016/069894 filed Aug. 23, 2016, which designated the U.S. and claims priority to EP Patent Application No. 15187738.8 filed Sep. 30, 2015, the entire contents of each of which are hereby incorporated by reference.

FIELD OF THE INVENTION

This invention relates to a method of managing a digital subscriber line, in particular to localising a fault on a digital subscriber line.

BACKGROUND

Digital subscriber line (DSL) services, commonly referred to as "broadband" services, are deployed using metallic PSTN lines that run between a digital subscriber line access multiplexer (DSLAM) and modems in subscribers' properties. With asymmetric DSL (ADSL) the DSLAM is located in the exchange and the line can be typically up to 7 km in length. With very-high bit-rate DSL (VDSL), the DSLAM is located in a local cabinet with the line being much shorter, typically a maximum of 2 km. The line is normally made up of a twisted copper pair, but can include lengths of aluminium.

Faults on DSL lines are not uncommon, and currently most faults are found by customers reporting problems such as their line being noisy, having slower than expected broadband speed, or even interrupted broadband service. Troubleshooting a fault often includes performing line tests on the line. Line tests can also be performed proactively to identify faults before a customer reports them. These line tests are typically electrical line tests that measure the electrical characteristics of a line and check that the results meet a standard (for example, as set out in SIN349 by British Telecommunications plc). It is also possible to compare line tests over a period of time to see if the line's electrical characteristics are deteriorating. Once a fault has been detected, an engineer can use electrical line testing, typically pair quality tests, to try and determine where the fault is located and make the appropriate repairs.

However, some fault conditions are not picked up by this process, and include intermittent faults or ones that are not severe enough to be measureable using existing techniques. Intermittent faults are particularly problematic to find but can cause great disruption to broadband services where a line drop can result in a service outage whilst the line retrains.

Furthermore, the deployment of PSTN lines requires joints to be made to join together different sections of cable. Joints are weather sealed, typically using a combination of gel filled crimp connectors and/or physical enclosures such as joint boxes, manholes and cabinets, and insulated from each other. However, weather sealing can fail allowing moisture into joints causing corrosion or conductivity between pairs, commonly known as a wet joint. Insulation can also be damaged by being abraded against physical objects such as trees, resulting in moisture affecting the line. Identifying such faults, so that an engineer can be sent to the appropriate location to rectify them can be difficult.

International patent application WO2013/154579 describes various diagnostic methods for telephone lines. Patterns of line data are used, and observed data distributions are classified using modelled distributions previously determined to correspond to known line activity, fault type, or fault location.

"Management of a DSL copper network using built-up qualification tools" by Martin Nilsson, Master's Degree Project, Stockholm 2005, provides an overview of DSL systems, and introduces concepts for regular monitoring measurements on a line performed periodically. The data is collected in a database for further analysis. A toolbox of programs are described to put the concepts into action.

SUMMARY OF THE INVENTION

According to one aspect of the present invention, there is provided a method of identifying a fault on a digital subscriber line in a telecommunications network, comprising:
  measuring a signal to noise ratio related parameter associated with the digital subscriber line;
  identifying variations in the signal to noise ratio related parameter;
  measuring a plurality of weather parameters associated with the digital subscriber line, wherein each weather parameter is obtained from a corresponding sensor having an associated location;
  comparing the signal to noise ratio related parameter with one or more predetermined conditions, wherein the predetermined conditions are based on signal to noise ratio related parameter characteristics associated with a population of lines operating normally; and if one or more of the predetermined conditions are not met, then
  determining the degree of correlation between the variations in the signal to noise ratio related parameter with each of the plurality of weather parameters; and
  identifying a location of a fault on the digital subscriber line as the location associated with the weather sensor that corresponds to the greatest determined degree of correlation.

The degree of correlation may be determined for variations in the signal to noise ratio related parameter with each of the plurality of weather parameters over a period of time. The period of time can be one or more days.

The signal to noise ratio related parameter can be the signal to noise ratio margin.

According to a further aspect of the invention, there is provided a control unit adapted to:
  measure a signal to noise ratio related parameter associated with the digital subscriber line;
  identify variations in the signal to noise ratio related parameter;
  measure a plurality of weather parameters associated with the digital subscriber line, wherein each weather parameter is obtained from a corresponding sensor having an associated location;
  compare the signal to noise ratio related parameter with one or more predetermined conditions, wherein the predetermined conditions are based on signal to noise ratio related parameter characteristics associated with a population of lines operating normally; and if one or more of the predetermined conditions are not met, then
  determine the degree of correlation between the variations in the signal to noise ratio related parameter with each of the plurality of weather parameters; and
  identify a location of a fault on the digital subscriber line as the location associated with the weather sensor that corresponds to the greatest determined degree of correlation

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

This invention relates to a method of managing a digital subscriber line, in particular for identifying the location of weather related faults. The invention continuously measures the signal to noise (SNR) margin on the DSL line as well as measurements from weather related sensors, such as moisture and wind sensors, which each have an associated geographical location. The SNR margin measures are compared to predetermined conditions based on SNR margin characteristics associated with a population of good lines. If the SNR margin measures fail to meet the predetermined conditions, the SNR measures are also compared to the weather sensor measurements over a day or number of days. If there is a correlation between the SNR margin measures and at least one of the sensors, then location of the fault is identified as the location of the sensor having the strongest correlation with the SNR measures.

Figure 1:
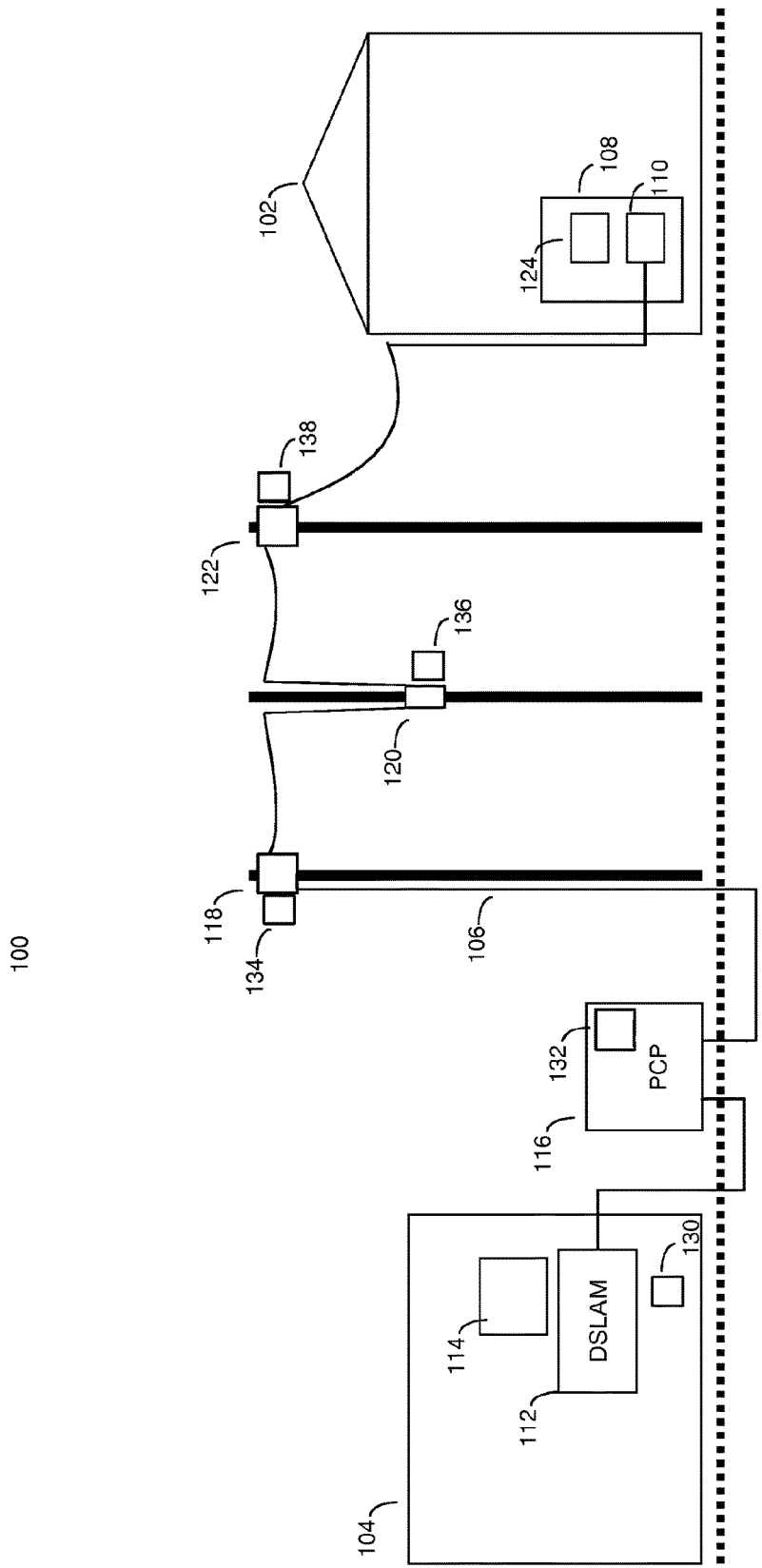
FIG. 1 is a system diagram of a network including a DSL line running from an exchange to a customer premises.

FIG. 1 illustrates a simplified diagram of an asymmetric digital subscriber line (ADSL) network 100. Some elements have been omitted for simplicity, and conversely in some practical deployments, some elements shown are not required.

The network 100 including a customer's premises 102 connected to a telephone exchange 104 via a telephone line 106. The telephone line 106 is a twisted metallic pair made of copper or aluminium. Within the customer premises 102, there is a customer premises equipment CPE 108, such as a router or residential gateway, and comprises a DSL modem 110. At the exchange 104, the line 106 is connected to a digital subscriber line access multiplexer DSLAM 112. The DSLAM 112 is a network element that provides DSL services to connected lines and associated customer premises. The line 106 is thus also referred to as a digital subscriber line, or DSL line, though it will be appreciated that the line can also provide PSTN services. The exchange also includes a control unit 114 that can gather measurements associated with the line 106 via the DSLAM 112.

Between the exchange 104 and the CPE 108, the line 106 passes through a number of connection points. The line 106 leaves the exchange and first passes through a Primary Cross-connection Point (PCP) 116, commonly referred to as a street cabinet, after it leaves the exchange 104. The cabling between the exchange 104 and the PCP 116 is largely to be found underground. The line 106 then goes overhead to a joint box 118 mounted on the top of a pole. The line continues to another pole and is jointed in another box 120 further down the pole. The line continues from there to yet another pole to an aerial Distribution Point (DP) 122. From the DP 122, the line 106 takes the form of an overhead drop wire, which terminates at the customer premises 102 at a network termination equipment (NTE) and onto the CPE 108 and modem 110.

Whilst only one line 106 and customer premises 102 are shown in FIG. 1, it will be appreciated that the network 100 will include other lines and associated customer premises, which have been omitted for simplicity. Each connection point will have many lines passing through it, with the PCP 116 having the most, and the DP 122 having the fewest, as lines get routed to alternative destinations.

Each connection point can be considered as a node or junction, as the line 106 is in practice made up of multiple sections of cable, and the joins between cable sections housed in the connection points.

The CPE 108 further includes a control module 124. The control module 124 gathers various parameters and measurements associated with the line 106 via the modem 110, and processes them in accordance with the invention as described below. The control module 124 may be implemented as a software module incorporated into the firmware of the CPE 108.

The network also includes several weather sensors 130, 132, 134, 136, and 138. The sensors measure weather related conditions, such as humidity, rainfall or wind. In this example, the sensors are leaf wetness sensors, which are usually deployed in the agricultural industry, see http://en.wikipedia.org/wiki/Leaf_wetness (retrieved on 30 Sep. 2015), and measures the amount of dew or precipitation on a surface. A typical leaf wetness sensor operates by measuring the change in electrical resistance between two metal conductors in an alternate finger configuration on a flat surface. The inventors have found that a leaf wetness sensor provides a good indication of the moisture on PSTN and DSL circuits.

Sensor 130 is located in the exchange 104, sensor 132 in the PCP 116, sensor 134 at the site of the joint box 118, and sensor 128 at the PCP 116. The location of these sensors is known when the sensors are installed. Measurements from the sensors can be obtained via a connection over the line 106, although it may be preferable to use some other means that does not rely on the line 106. For example, the sensors could operate wirelessly in conjunction with some control stations (not shown). The measurements from the sensors can be shared with the control unit 114 or control unit 124, as well as their known locations.

Additional sensors can be positioned elsewhere in the network 100. The locations of the sensors are preferably at one or more points along the line 106 that are most likely to experience weather impact, in particular moisture ingress. This is most likely to occur at junctions between sections of the cable that make up the line 106, and hence the sensors being present in the PCP 116 and joint boxes. Ideally, the sensors are spaced apart, to ensure that a wide variety of locations along the line are covered. Such sensors would thus have different locations from each other.

The sensors, in particular sensors 134, 136 and 138 could each be replaced with a number of directional leaf wetness sensors, one facing in each direction of north, south, east and west. The significance of using such an array of sensors will be described later.

Whilst the present example shows a DSLAM 112 residing in the exchange 104, the invention would still be applicable to configurations where the DSLAM is located elsewhere. For example, in a fibre to the cabinet (FTTC) arrangement, the DSLAM 112 might be located in the PCP 116, an example of which is a roadside cabinet, which is typically located nearer the customer premises than the exchange.

In an alternative network arrangement, DSLAM like functionality can be provided by an MSAN (multi services access node), which also provides other capabilities such as voice. The DSLAM and MSAN are both examples of aggregation transceiver devices, which effectively aggregate a number of DSL lines, terminating them at a plurality of modems housed within.

An example of the present invention will now be described with reference to the flow chart of FIG. 2.

Processing starts at step 200, with the modem 110 measuring the SNR margin associated with the line 106. The SNR margin is the difference between the measured SNR and the SNR required to operate the line at a specific synchronisation rate, where the measured SNR is an instantaneous measure of the ratio of the received wanted DSL signal power to unwanted interference signals or noise. For example, if the line is synchronised at 8 Mbs and needs 35 dB of SNR to operate at this rate, and the measured SNR is 41 dB, then the SNR margin would be 6 dB.

The SNR margin is monitored every 60 seconds over 24 hour cycles, and the results are gathered by the control module 124, which stores them for processing. The SNR margin measurements can be gathered more or less frequently depending on the configuration of the modem 110 in the CPE. The downstream SNR margin is used here, as it is the service on the downstream channel that a customer notices most, rather than the upstream channel. Furthermore, the downstream channel is more sensitive (compared to the upstream channel) to faults, making it easier to identify variations.

Figure 3:
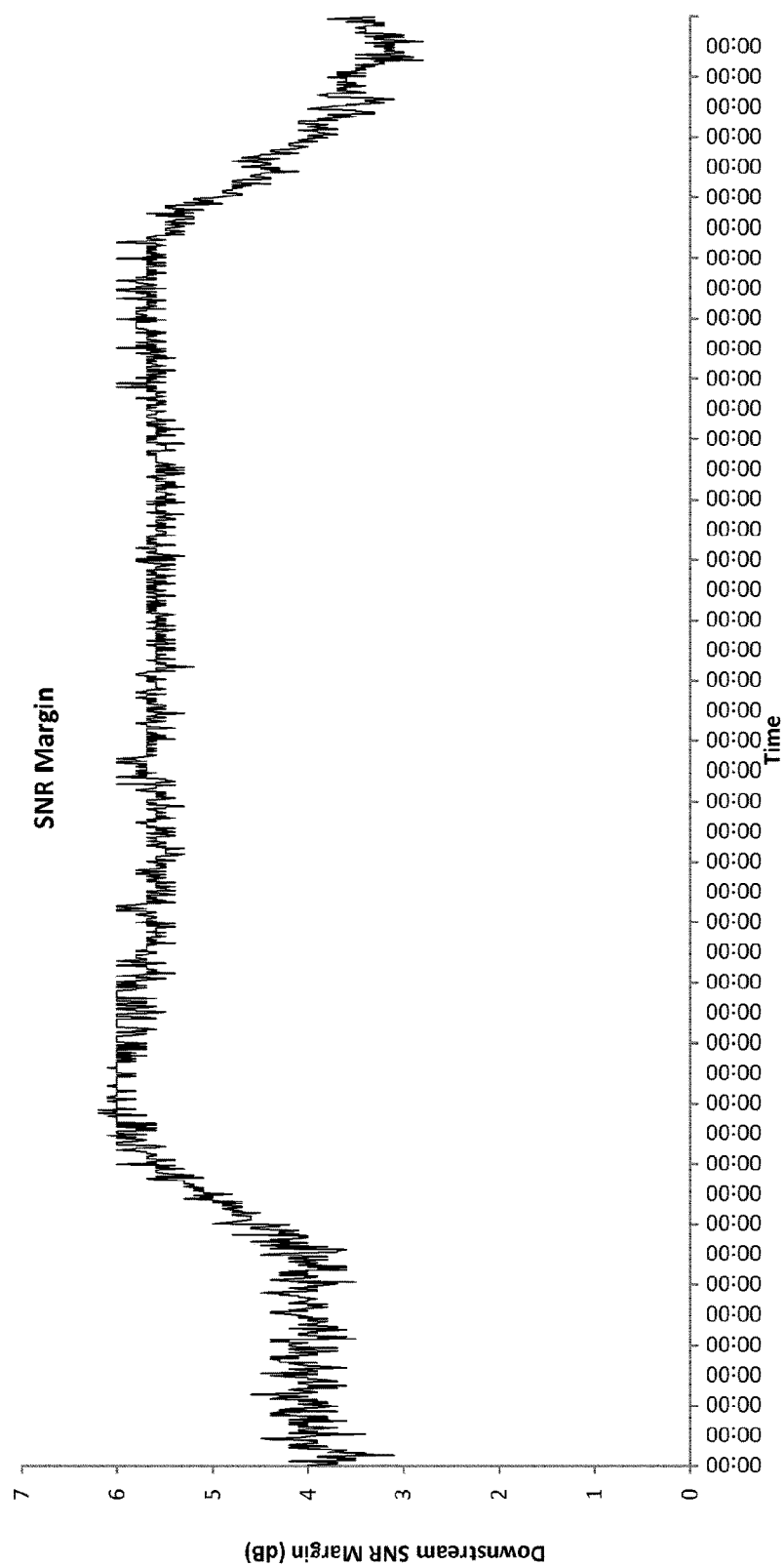
FIG. 3 is a graph showing the SNR margin for a good line over a 24 hour period.

FIG. 3 illustrates a graph of the (downstream) SNR margin over a 24 hour period for a line operating without any significant faults. The SNR margin exhibits a diurnal pattern (which is caused by radio interference increasing during the hours of darkness as a result of ionosphere effects) causing the SNR margin to drop between 8 pm and 5 am.

The SNR margins from a large population of good lines (i.e. lines considered to be fault free) are analysed in this way to determine SNR margin characteristics that are representative of the good lines. The SNR margin measurements can be taken over a number of days and averages taken, before being processed to identify the specific characteristics common to the good lines. In this example, the following characteristics are identified:
 1. The daily SNR margin variation is around 3 dB
 2. Maximum short term (5 minutes) SNR margin variation is around 0.5 dB
 3. Maximum rate of change of SNR margin is around 0.5 dB per minute The first characteristic reflects the diurnal variation over the course of a 24 hour period. The second characteristic reflects the gradual change in SNR margin that can take place. The third characteristic maps the minute by minute variation, usually due to background noise.

These SNR margin characteristics are used to generate test conditions with associated thresholds. Other characteristics might be identified and used as well or instead. The SNR margin measurements from step 200 are compared against these test conditions. A line with measurements that do not meet at least one of the test conditions is considered not to be operating normally and to be exhibiting a potential fault, and therefore tested with an electrical line test. In this example, based on the above characteristics, the following test conditions and thresholds are set:
 1. Daily SNR margin variation<=4 dB
 2. Short term (5 minutes) SNR margin variation<=2 dB
 3. Rate of change of SNR margin<=2 dB per minute In this example, these test conditions are generated in advance but can be adjusted and updated by the network operator as required, and may be based on further inputs. The test conditions and predetermined thresholds are stored by the control module 114, and used in step 202. Note the thresholds are set slightly above the observed characteristics to account for minor variations that are not indicative of a fault.

In step 200, the measurements from the weather sensors 130, 132, 134, 136 and 138 are also gathered. In this example, leaf wetness sensors are used, with the resulting leaf wetness measurements calibrated from 0 to 15, with 0 indicating dry and 15 indicated 100% saturated or wet. The measurements are preferably taken at regular intervals e.g. every 60 seconds. Other sensor types could also be used as will be described later.

The leaf wetness measurements are gathered and stored by the control module 114. Note, the control module 114 also stores the location of each of the sensors.

In step 202, the resulting SNR margin measurements are analysed and compared by the control module 124 against the test conditions. In this example, the comparison is done every 24 hours. It is possible to perform the analysis more frequently, and indeed at the same interval as the SNR or sensor measurements are taken. However, greater accuracy and confidence in the method results from processing repeatedly with longer intervals such as every 24 hours.

In step 204, if the SNR margin measurements from the line 106 do meet the test conditions, then processing passes back to step 200, where the SNR margin continues to be monitored and analysed every 24 hours (or over some interval).

If the SNR measurements from the line 106 do not meet the test conditions, then a potential fault might be occurring and processing passes to step 206 to determine whether there is a correlation between the SNR variations and the sensor measurements to try and identify the location of the fault.

Figure 4:
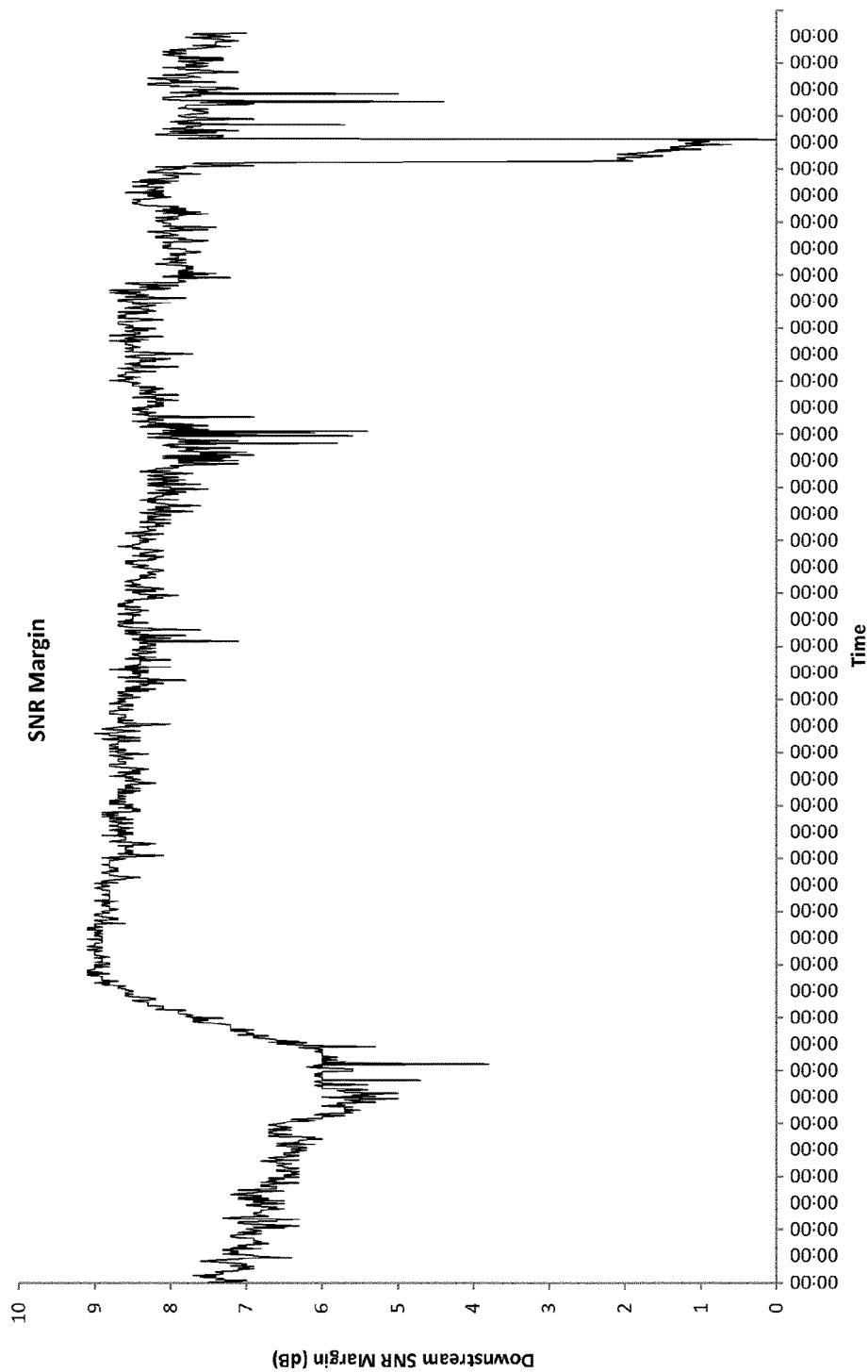
FIG. 4 is a graph showing the SNR margin for a potentially faulty line over a 24 hour period.

FIG. 4 shows graphs of SNR margin measurements for an example line that fails to meet the test conditions. FIG. 4 plots the (downstream) SNR margin reported every 60 seconds. Thus, the SNR margin characteristics of this line deviates from the target in a number of ways:
 1. At 04:11 the SNR margin drops by just over 2 dB in a minute.
 2. Around 16:00, there are several variations in the SNR margin of just over 2 dB in a minute.
 3. At 21:30 the SNR margin drops by 6 dB in 1 minute.
 4. The SNR margin continues to fall until at 10 pm it reaches 0 and causes a line re-sync, with periods where the short term SNR margin variation is also greater than 2 dB over 5 minutes.

Furthermore, the line actually re-syncs at a lower rate which is almost 1 Mbps lower than before but restores the SNR margin to the target 9 dB.

Hence, the example in FIG. 4 fails the test conditions at 4 different times. SNR margin measurements that do not meet the test conditions are sometimes also referred to as SNR perturbations.

In step 206, the moisture level measurements given by each of the leaf wetness sensors are analysed to correlate them to the SNR margin variations. Thus, the sensor measurements are correlated with the SNR margin measurements over time, with the aim to identify the sensor that has the strongest correlation, and thus identify a location of a potential fault.

Various correlation techniques can be used, such as Spearman's ranked correlation which results in a correlation coefficient in the range of +1 (strong positive correlation) to −1 (strong negative correlation) for each sensor. In this example, where the SNR margin could typically drop when there is a fault on the line, and leaf wetness increases with increased moisture, a strong negative correlation would indicate that moisture might be a cause of the fault. The correlation results from step 206 are stored in step 208.

In step 210, the results from the correlation are analysed to determine whether any of the sensors give rise to measurements that correlate well with the SNR measurements. If one or more of the sensors give a good degree of correlation (e.g. above some threshold value), then the sensor giving the strongest correlation is identified, and a potential fault location is identified as the location of the identified sensor. For example, if sensor 134 gives rise to measurements with a strong correlation to the SNR measurements, then the location of sensor 134 (DP 118) is identified as the location of the potential fault.

If there are previously stored correlation results, e.g. from previous 24 hour intervals, then these can be analysed in step 210 as well to get a more accurate results.

If there is no correlation between any of the sensors and the SNR measurements, then processing passes back to step 200 for the process to be repeated. Similarly, processing will still pass back to step 200 for the process to be repeated when a potential fault location has been identified. This is because weather related faults are intermittent in nature, and weather itself is dynamic, so it may take many days of measurements to get any correlation and to get a sensor that clearly correlates better than any other.

Figure 5:
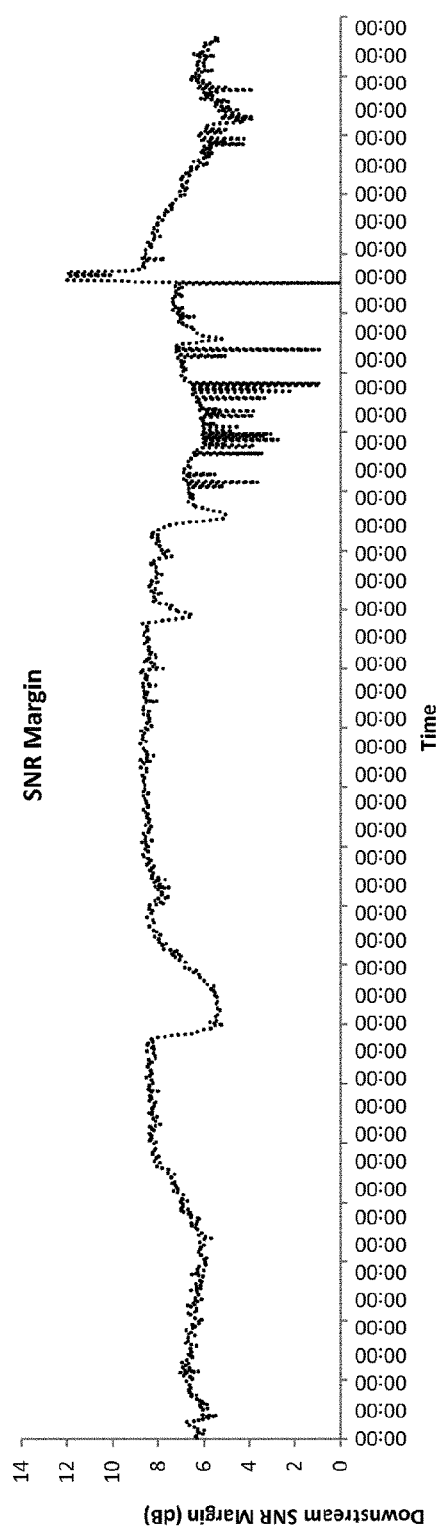
FIG. 5 is a graph showing the SNR margin over a 24 hour period for an example line.
Figure 6A:
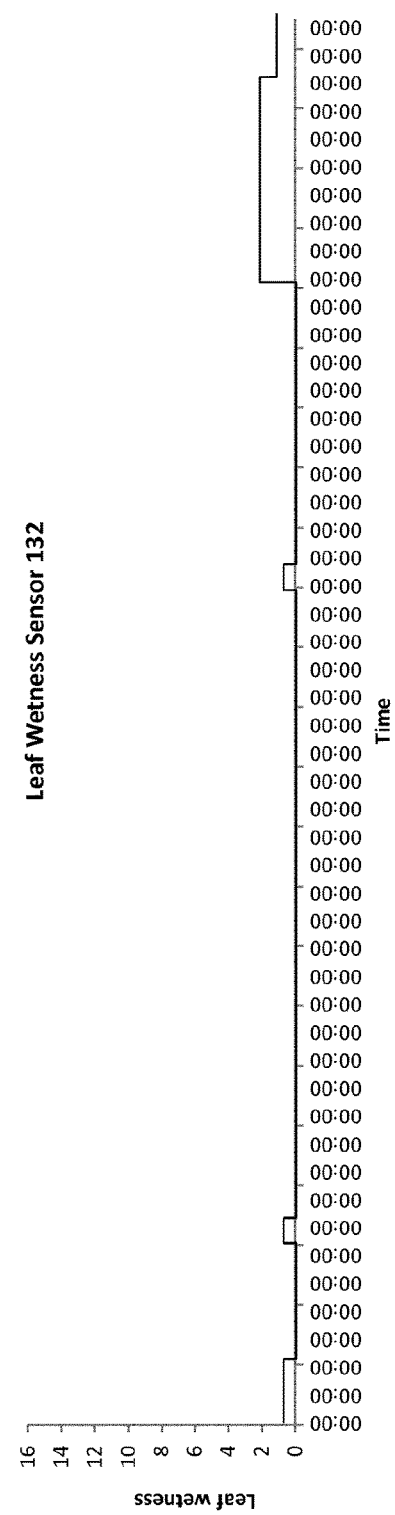
FIG. 6a is a graph showing the leaf wetness levels over a 24 hour period for a first sensor.
Figure 6B:
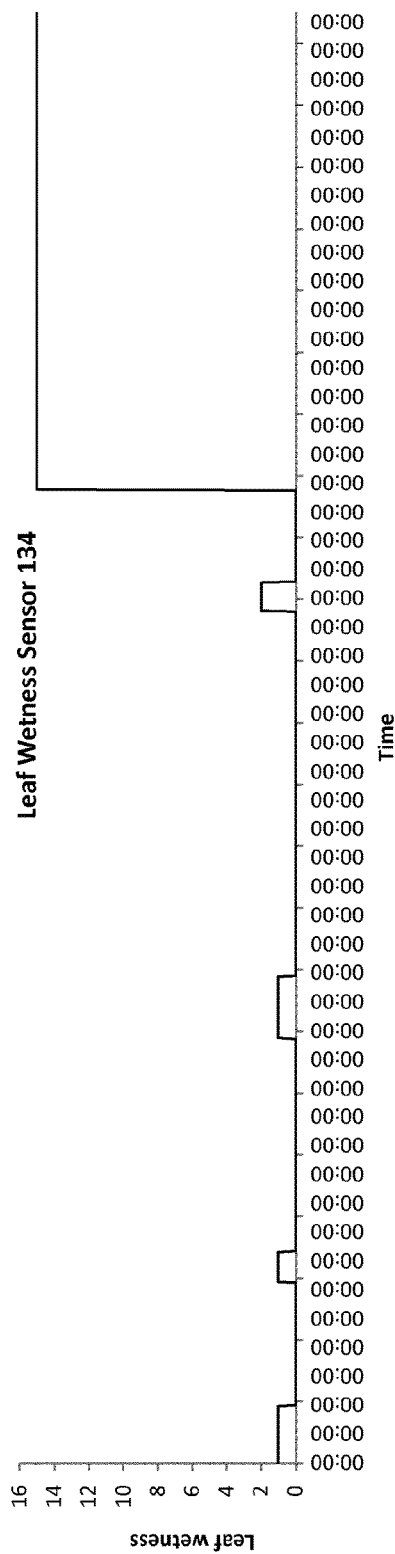
FIG. 6b is a graph showing the leaf wetness levels over a 24 hour period for a second sensor.
Figure 6C:
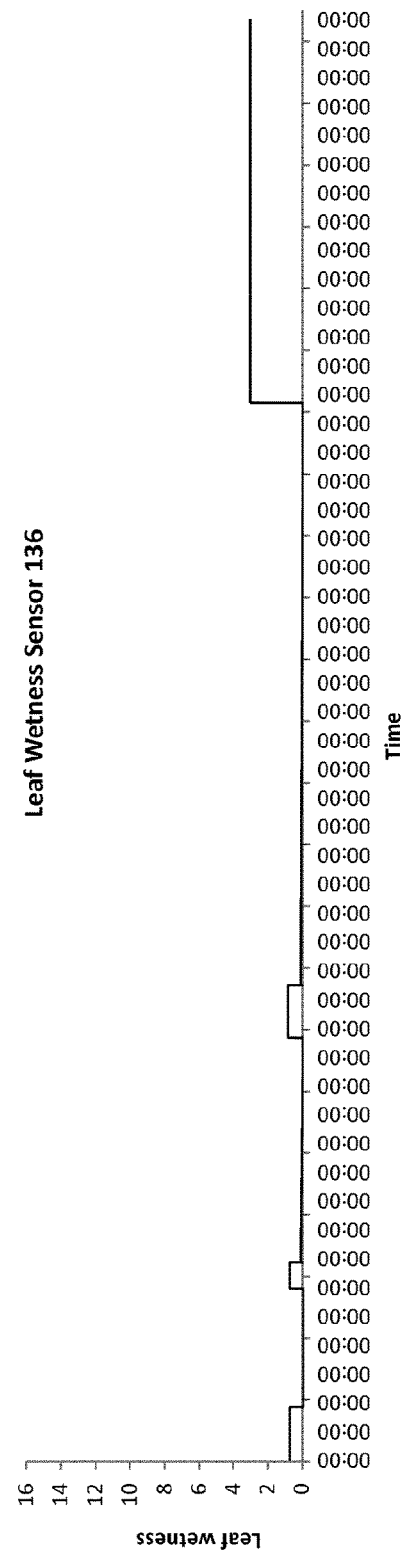
FIG. 6c is a graph showing the leaf wetness levels over a 24 hour period for a second sensor.

FIGS. 5 and 6 show various graphs that help illustrate an example of the invention. FIG. 5 shows a graph of SNR margin measurements over a 24 hour period for an example line. FIGS. 6a, 6b and 6c show leaf wetness measurements for the same line from sensors 132, 134 and 136 respectively.

The SNR measurements shown in FIG. 5 fail to meet the test conditions (from step 204) at various times. For example, around 07:00, the SNR margin variation is slightly more than 2 dB over a 5 minute period. Similarly, at around 16:30, the SNR variations are significant enough that the test conditions are not met again, and remain significant for the following 4 hours or so.

FIG. 6a shows small non-zero values (slight dampness) in the leaf wetness measurements at various times through the day that are otherwise largely zero (dry). However, none of these non-zero values overlap with the SNR margin variations in FIG. 5. Thus, the resulting correlation between the measurements from sensor 132 and the SNR measurements would be small over that 24 hour period.

The measurements shown in FIG. 6b from sensor 136 have a much better correlation with the SNR measurements in FIG. 5. There is a non-zero leaf wetness value starting around 07:00, which is also one point when the SNR margin starts to vary significantly. And also around 16:00, there is a sudden increase in the leaf wetness value (saturated) that remains for the rest of the day, which coincides largely with when the SNR margin varies significantly, starting around 16:30. Thus, the resulting correlation between the measurements from sensor 134 and the SNR measurements would be large over the 24 hour period.

The measurements shown in FIG. 6c from sensor 136 have some non-zero values, including one starting around 07:00, which is also when the SNR margin starts to vary significantly. Also around 17:45, there is an increase in the leaf wetness value, though the value is quite low (and less than that from sensor 136 around the same time, which does overlap with some SNR margin variations. However, more significant is that the increase starts significantly later, 17:45, compared to when the SNR margin variations start, around 16:30. Thus, the resulting correlation between the measurements from sensor 136 and the SNR margin measurements would be greater than that associated with sensor 133, but less than that of 136 over the 24 hour period.

Therefore, in this example, sensor 134 exhibits the strongest correlation, and thus the location of sensor 134 would be identified as the location of a potential fault i.e. DP 118.

It can be seen from the sensor measurements in FIGS. 6b and 6c that the timing of any measured values plays an important role. If a line is exhibiting a weather related fault that is brought on by heavy rain, then the difference in time between rain falling at one sensor location along the line compared to another sensor location along the line will be small. However, if the interval between measurements is small enough, then these differences will be picked up over time, and reflected in the correlation. Furthermore, the accuracy of the correlation will increase with increased number of periods the correlation is performed over, that is to say, increasing from a single 24 hour period to multiple 24 hour periods. Hence the method in FIG. 2 repeats over multiple periods.

As suggested earlier, directional sensors could be used. For example, an array of sensors at a single location facing in different directions (e.g. north, south, east and west) could be used. Such an arrangement would help pick up faults that only occur when certain weather conditions are from a specific direction e.g. driving rain from the east. Alternatively, multidirectional sensors, or sensors that aren't affected by a direction could be used.

Whilst the examples refer to SNR margin measurements, a person skilled in the art will appreciate that an absolute measure of the SNR associated with the line can be used instead an alternative indicator of the performance of the line. Furthermore, other SNR related parameters could also be used, such as error count.

Examples of the invention are realised, at least in part, by executable computer program code which may be embodied in an application program data. When such computer program code is loaded into the memory of a processor in the control module 114 or 124, it provides a computer program code structure which is capable of performing at least part of the methods in accordance with the above described exemplary embodiments of the invention.

Figure 2:
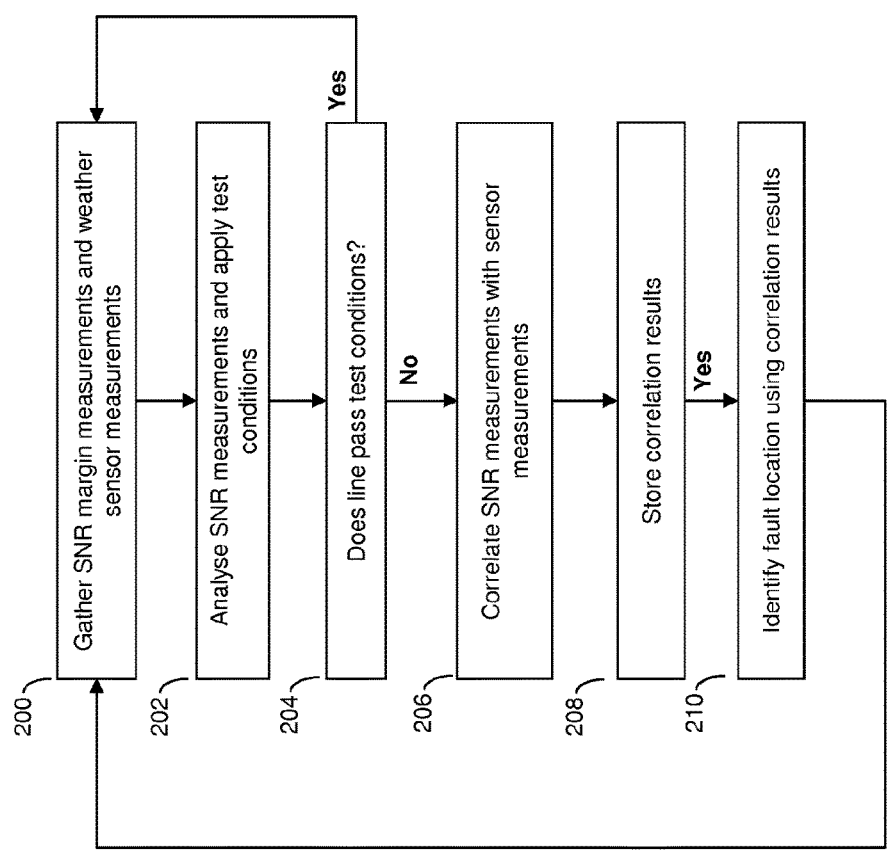
FIG. 2 is a flow chart illustrating the steps of an example of the present invention.

A person skilled in the art will appreciate that the computer program structure referred can correspond to the flow chart shown in FIG. 2, where each step of the flow chart can correspond to at least one line of computer program code and that such, in combination with the processor in the control module 114 or 124, provides apparatus for effecting the described process.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of identifying a fault on a digital subscriber line in a telecommunications network, comprising:
   measuring a signal to noise ratio related parameter associated with the digital subscriber line;
   identifying variations in the signal to noise ratio related parameter;
   measuring a plurality of weather parameters associated with the digital subscriber line, wherein each weather parameter is obtained from a corresponding sensor having an associated location;
   comparing the signal to noise ratio related parameter with one or more predetermined conditions, wherein the predetermined conditions are based on signal to noise ratio related parameter characteristics associated with a population of lines operating normally; and if one or more of the predetermined conditions are not met, then
   determining the degree of correlation between the variations in the signal to noise ratio related parameter with each of the plurality of weather parameters; and
   identifying a location of a fault on the digital subscriber line as the location associated with the weather sensor that corresponds to the greatest determined degree of correlation.

2. A method according to claim 1, wherein the degree of correlation is determined for variations in the signal to noise ratio related parameter with each of the plurality of weather parameters over a period of time.

3. A method according to claim 2, wherein the period of time is one or more days.

4. A method according to claim 1, wherein the signal to noise ratio related parameter is the signal to noise ratio margin.

5. A non-transitory computer-readable storage medium storing a computer program or suite of computer programs which upon execution by a processor performs the method of claim 1.

6. A control unit adapted to:
   measure a signal to noise ratio related parameter associated with the digital subscriber line;
   identify variations in the signal to noise ratio related parameter;
   measure a plurality of weather parameters associated with the digital subscriber line, wherein each weather parameter is obtained from a corresponding sensor having an associated location;
   compare the signal to noise ratio related parameter with one or more predetermined conditions, wherein the predetermined conditions are based on signal to noise ratio related parameter characteristics associated with a population of lines operating normally; and if one or more of the predetermined conditions are not met, then
   determine the degree of correlation between the variations in the signal to noise ratio related parameter with each of the plurality of weather parameters; and
   identify a location of a fault on the digital subscriber line as the location associated with the weather sensor that corresponds to the greatest determined degree of correlation.

* * * * *